US005664202A

United States Patent [19]
Chen et al.

[11] Patent Number: 5,664,202
[45] Date of Patent: Sep. 2, 1997

[54] INTELLIGENT POWER CONSUMPTION MONITORING AND CONTROL SYSTEM

[76] Inventors: Ding Chen; Zhe Chen, both of No. 6, 14-122, N. Huanghe St., Huang Gu District, Shenyang, Liaoning Province 110031, China

[21] Appl. No.: 426,012

[22] Filed: Apr. 20, 1995

[51] Int. Cl.⁶ .............................. G06F 1/26; G08C 19/00
[52] U.S. Cl. .............. 395/750.08; 324/110; 340/870.02; 364/492; 395/750.01
[58] Field of Search .................... 395/750, 182.2; 364/483, 492; 324/110, 98; 340/870.02, 870.03

[56] References Cited

U.S. PATENT DOCUMENTS

| | | | |
|---|---|---|---|
| 4,700,188 | 10/1987 | James | 340/870.03 |
| 4,749,992 | 6/1988 | Fitzemeyer et al. | 340/870.02 |
| 5,122,735 | 6/1992 | Porter et al. | 324/142 |

*Primary Examiner*—Glenn A. Auve
*Attorney, Agent, or Firm*—Richard C. Litman

[57] ABSTRACT

An intelligent power consumption monitoring and control system is provided. The system is composed of a computer with management software, a group of communication controllers consisting of transmitters, receivers, and modems and insulators. The communication controller connects to a data exchanger in the user's intelligent meter which is composed of a meter case, a data display, and a PCB board. A buzzer, a select button, and an alarm reset button are designed on the face of the meter case. On the PCB board, there is a single chip microcomputer, program storage, data memory, a transmitter and receiver module, an A/D and D/A conversion module, a theft control, a power line balance detection module, as well as a power supply module. The invention solves many problems in current power supply management and is an effective total automatic power supply management system with a computer network.

2 Claims, 6 Drawing Sheets

INTELLIGENT POWER CONSUMPTION MONITORING AND CONTROL SYSTEM

BACKGROUND OF THE INVENTION

The present invention relates to a comprehensive electrical power supply management system which uses a computer network for monitoring and control.

There are many disadvantages in measuring and monitoring the current power supply in China. For example, the currently used power consumption meters are only price-billing machines, so it is hard for Chinese to charge the user on power consumption at the time of both critical-load and non critical-load. Although the load of network power supply can be adjusted by shutdown on different load hours in some regions, the effects are not satisfactory; this can mean trouble for the customers too. The process of tariff billing and collection is still a difficult burden to the power supply company.

Also, another problem involves the theft of power from power lines. Unauthorized access to power lines cannot be effectively controlled unless some means of manual inspection is employed.

SUMMARY OF THE INVENTION

The present invention provides an intelligent power consumption monitoring and control system which allows the computer to automatically manage the power supply system. The present invention is composed of a central controller, a power consumption data transfer mechanism, and a series of intelligent power consumption meters. Network management software runs a computer at a central controller. A communication controller, part of a larger communication mechanism, is connected to the central controller via a cable. The communication mechanism consists of the communication controller and communication media. The communication controller consists of a highly sensitive receiver and high power transmitter with modems and insulators to convert analog and digital signals and to separate AC signals. The communication controller is connected with the data communication parts of intelligent meters through data medium.

There are various connections which are carried throughout power lines, special communication lines, and/or radio waves. The present invention has a network structure similar to the shape of a star. The first type of connection is suitable for civil application and general power supply. The other two types of connections are suitable for the situation in which high quality signal demand is required, or power line data transfer is limited.

The intelligent power meter PCB board has a buzzer connected to a display select button and an alarm reset button on the face of the meter case. On the PCB board, there is a single chip microcomputer, a program storage, a data memory, a transmitter, a receiver module, an A/D and D/A module, a theft control and power line balance detect module, and a power supply module. To allow the meter to possess electronic and automatic functionality, various technology is employed, such as a current detection circuit, a voltage measuring circuit, a power counting circuit, a theft and unbalance alarming circuit, a communication control circuit, a power supply failure protection circuit, an address coding circuit, and a display alarming circuit.

Figure 7:
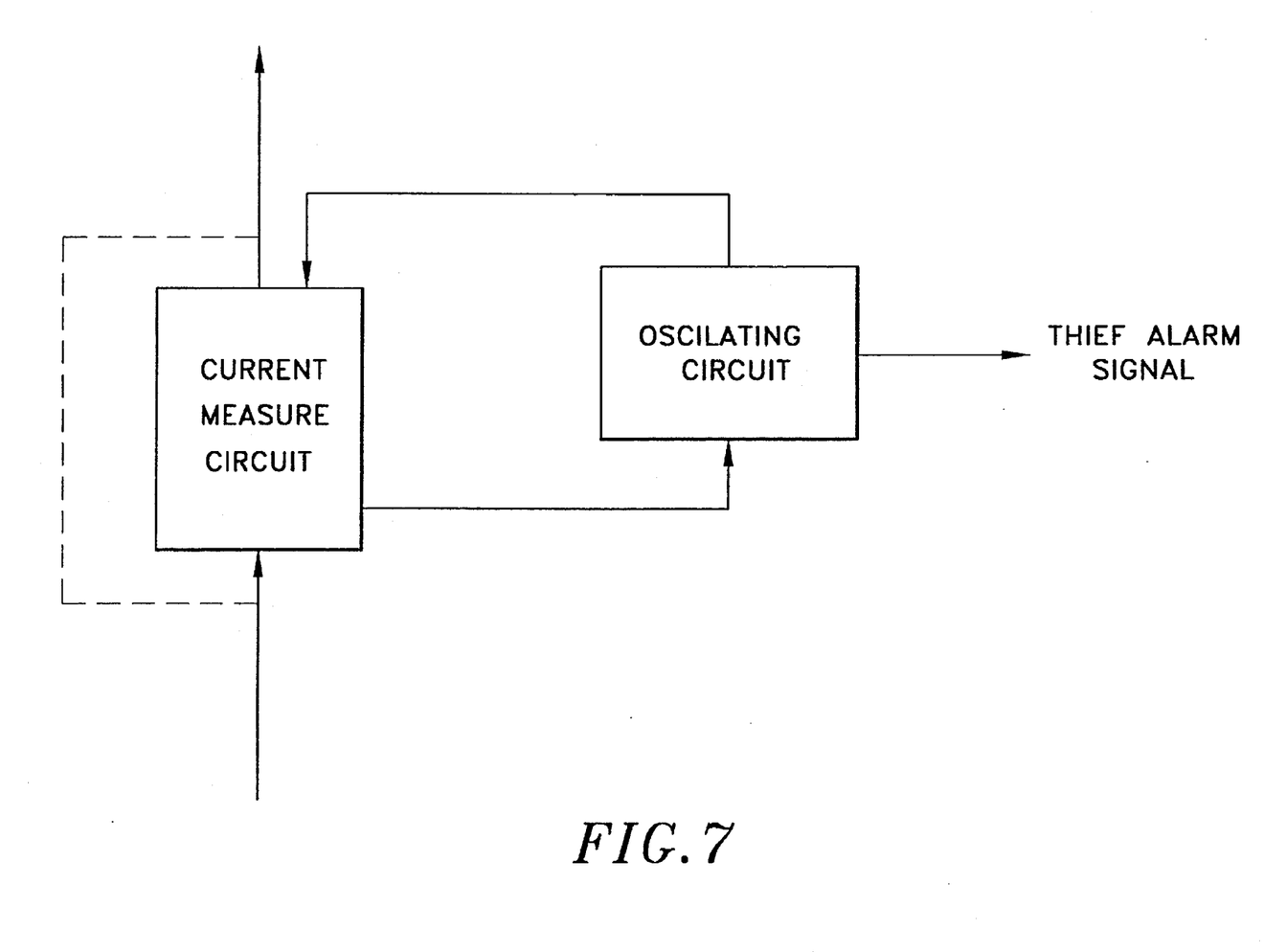
FIG. 7 is a schematic diagram of the thief detection module in the meter of the present invention.

The main part of theft detection module, as shown in FIG. 7, is an osciilating circuit. The feedback of the circuit connects to the current detection circuit in the power supply circuit. The oscillating circuit will work normally if there is no theft; but if any theft occurs, the oscillating will cease because no feedback will be carried on. The single chip microcomputer will detect the tapping of power immediately, and know how to handle it. Accordingly, it is a principal object of the invention to employ software to do the following:

1. Manage basic data of the power users; handle inside code and outside address of the meter; handle customer's address, name, tariff deposit, accumulated deposit, the total consumed watt- hours, the watt-hour available; provide the reason for each power cutoff; and handle the way and the date of the penalty executed as well as the amount of time and the payment.

2. Put the user's tariff deposit into the computer, with respect to his/her account number, and then send that deposit information to the user's individual meter and store it there.

3. Scan the meter in the covered region sequentially, collect consumed watt-hours, make theft marks and record the time the theft occurred.

4. Resume power supply, via the control center, to the illegal customer after the penalty paid. In short, the center automatically switches the meter to an "on" or "off" position for the certain user and erases the theft mark, the time record, and the alarming tag during the resumption.

5. Scan out a disabled meter, record the problem, and then inform the operators.

6. Send messages to all meters managed in the covered area by broadcasting set settings, including real time clock, time-on-load separation, and power limitation definition.

7. Analyze statistics of working meters at different levels, detect whether the power lost is due to reasonable or illegal usage.

8. Execute, through the control center, short, medium or long term statistics on user's record and send to upper management offices.

Accordingly, it is a principal object of the invention to employ the Intelligent Meter to achieve the following:

1. Each meter has a special address code and a common address code. The special address code can be accessed by the control center as a certain address, and the common address is accessible on the broadcasting system.

2. The meter will keep low power consumption if it stays on a communication standby and sends no messages out. It receives only system messages under system broadcasting, but will receive and store messages first, then send out data back to the caller during conversion. The power consumption will stay high while the meter sends out data.

3. Watt-hours counting depends on the load used. There are 10 time sections available. Time separation definition can be set on system broadcasting data, including a real-time clock, the total number of time sections, the start and stop of each time section, the rank of each time section, and the unit price of each time section.

4. On the 10 time section, the counting precision is no lower than 1/256 (one byte per decimal); the maximum watt-hours that can be storaged is 16777216 KWH; the length of watt-hour display is four digits.

5. The computer on the control center sends the user's deposit to his/her meter, the consumed watt-hours will be converted into money to compare with the deposit value. If the consumption reaches the deposit for a certain value, the meter will alarm. The user can push the alarm reset button to stop the alarm when he/she recognizes that the alarm has been tripped, but the time he/she pushed the button will be recorded in the meter to show that the user already knows the alarm has gone off. If the user's deposit is exceeded, the meter will cut-off the power supply line. In such a situation, the user cannot resume power.

The only way for the user to solve the problem is to pay the tariff so that the control center will resupply the power.

6. The meter automatically tests the phase difference between voltage and current and calculates the power factor.

7. If the user steals power, the meter will first alarm for a minute and then cut-off the power supply and record the theft, the date, and time. The power supply will be resumed after the illegal action has been dealt with.

8. The data stored in the meter cannot be lost, even if power supply is cut-off. The data will continue to affect meter operation immediately after power resumption.

9. The meter controls its maximum power limitation by the data transferred from control center.

10. There are different kinds of meters available such as single and multi-phase or high, medium, and lower power.

DETAILED DESCRIPTION OF THE PREFERRED EMBODIMENTS

Figure 1:
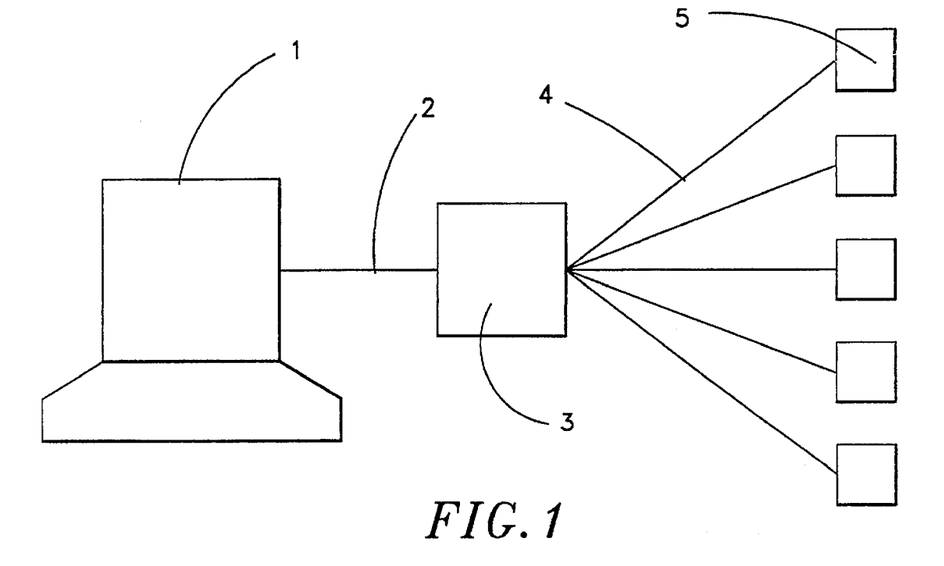
FIG. 1 is a schematic diagram of the structure of the present invention.
Figure 5:
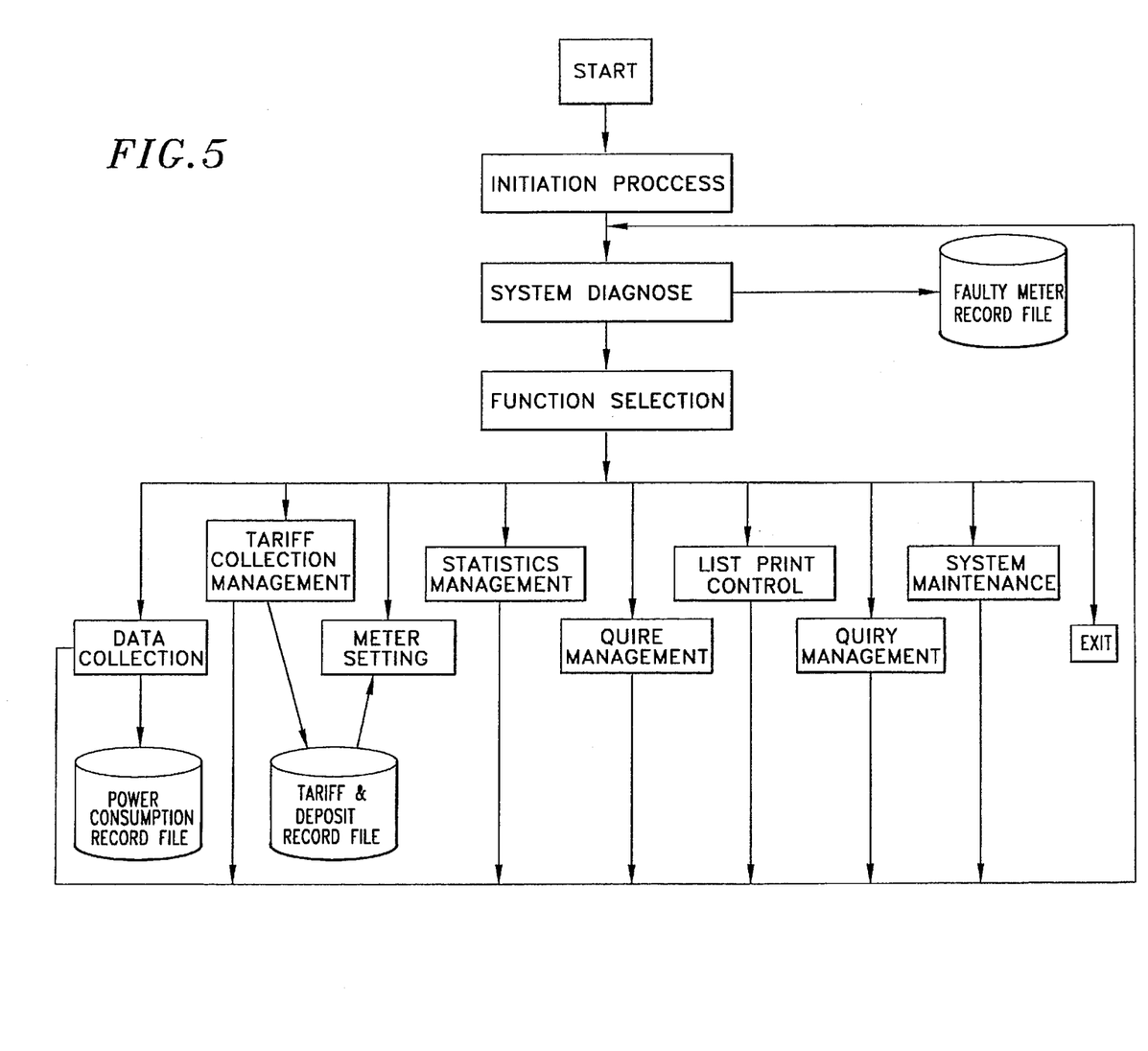
FIG. 5 is a flow diagram of the control center software of the present invention.

In one preferred embodiment of the present invention, as shown in FIG. 1, a personal computer serves as a control center computer 1 operating software according to the software flowchart as shown in FIG. 5. The control center computer 1 is connected to a communication controller 3 in the data transferring mechanism with a cable 2. The communication controller 3 consists of a transmitter and a receiver with modems and insulators, or civil and common power supply system data communication medium 4 serve as AC power supply lines whereby data is modulated, demodulated and transfered through common power supply lines.

Figure 2:
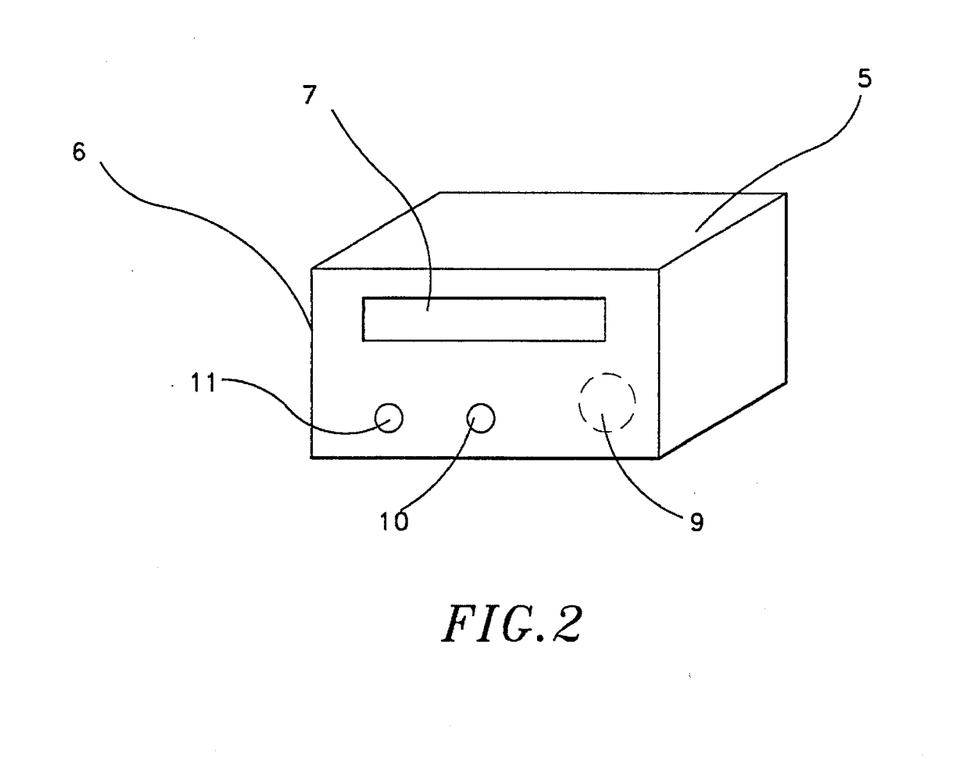
FIG. 2 is a schematic diagram of the meter structure of the present invention.

As shown in FIG. 2, the intelligent power meters 5 are each composed of a meter case 6, a data display part 7 and a meter PCB board 8. A buzzer 9, a display selection button 10, and an alarm reset button 11 are designed on the face of the intelligent power meter case 6.

Figure 3:
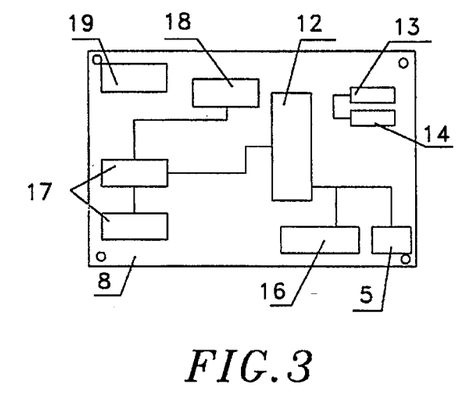
FIG. 3 is a schematic diagram of the meter PCB board of the present invention.

As shown in FIG. 3, on the PCB board 8, there is a single chip microcomputer 12, program storage 13, data memory 14, a transmitting module 15, a receiver module 16, A/D and D/A converter module 17, a thief control and power line balance detection module 18, and power supply module 19.

Figure 4:
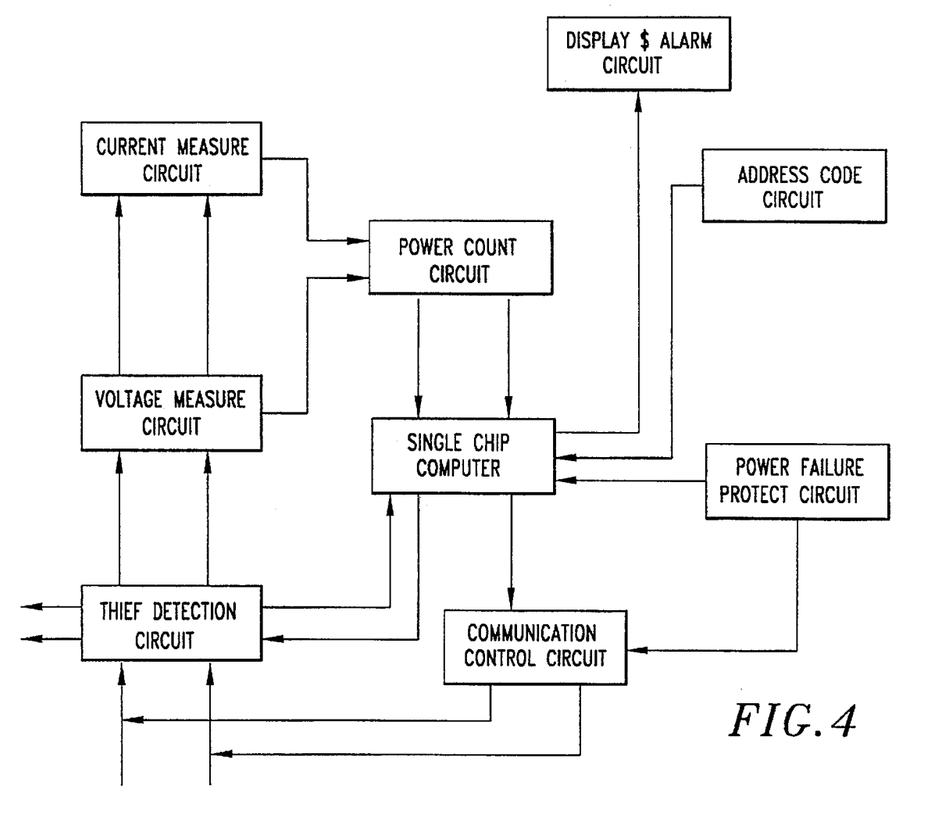
FIG. 4 is a flow diagram of the meter of the present invention.
Figure 6:
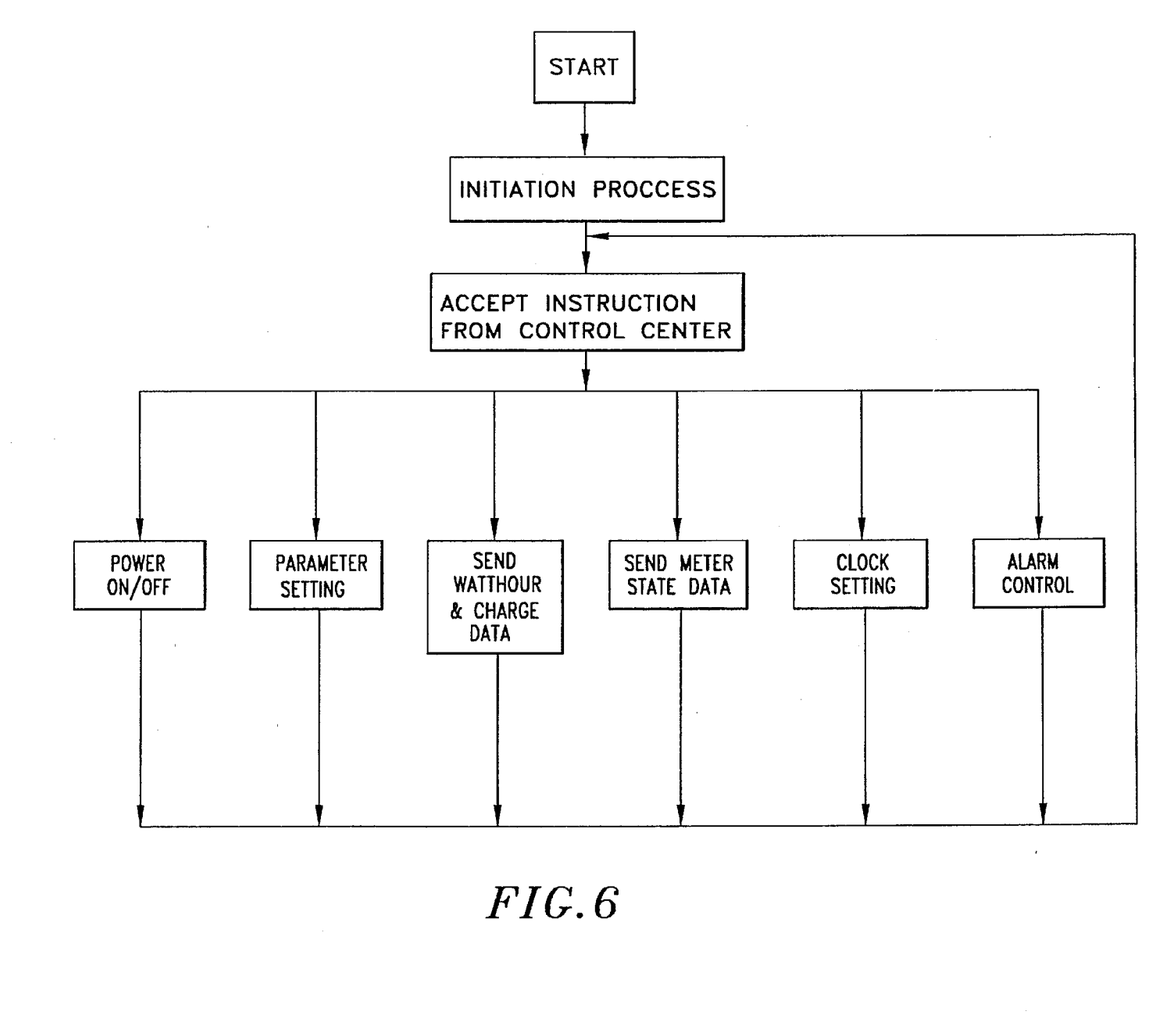
FIG. 6 is a flow chart of the meter software of the present invention.

The system works as follows, as shown in FIGS. 4–6:

After a series of intelligent power consumption meters 5 are installed, the computers at the central controller 1 will first recognize it. After the user makes a deposit, the central controller 1 will set the intelligent power consumption meters 5; that is, to define the counting and power limitation. Then, the central controller 1 computer switches on the intelligent power consumption meters 5 so as to let the meters 5 work.

During non-critical time, the central controller 1 will run a maintenance program to check the status of the power supply network and every intelligent power consumption meter 5. The central controller 1, will record them for management supervisors. At the data collection period, the central controller 1 runs a data collection program. The central controller 1 calls each intelligent power consumption meter 5 to collect data and put the data into record files through a polling method.

If the watt-hour charging standard, e.g. the time section or price, needs to be changed, the present invention will set all intelligent power consumption meters 5 in the covered region on the broadcast wavelength. To insure that the timing and charging are correct, the central controller will adjust the real-time clock of every intelligent power consumption meter 5 by broadcasting a model.

After data collection and diagnostic execution, the central controller 1 runs statistics on the record data to detect illegal users and disordered intelligent power consumption meters 5. A printout of such information can be printed if required. The intelligent power consumption meters 5 will be mounted on topological structures. The theft, which occurs in front of the user's intelligent power consumption meter 5, could also be detected by statistics; as in FIG. 8, for example, a thief acts at a power line before intelligent power consumption meter A1'.

Figure 8:
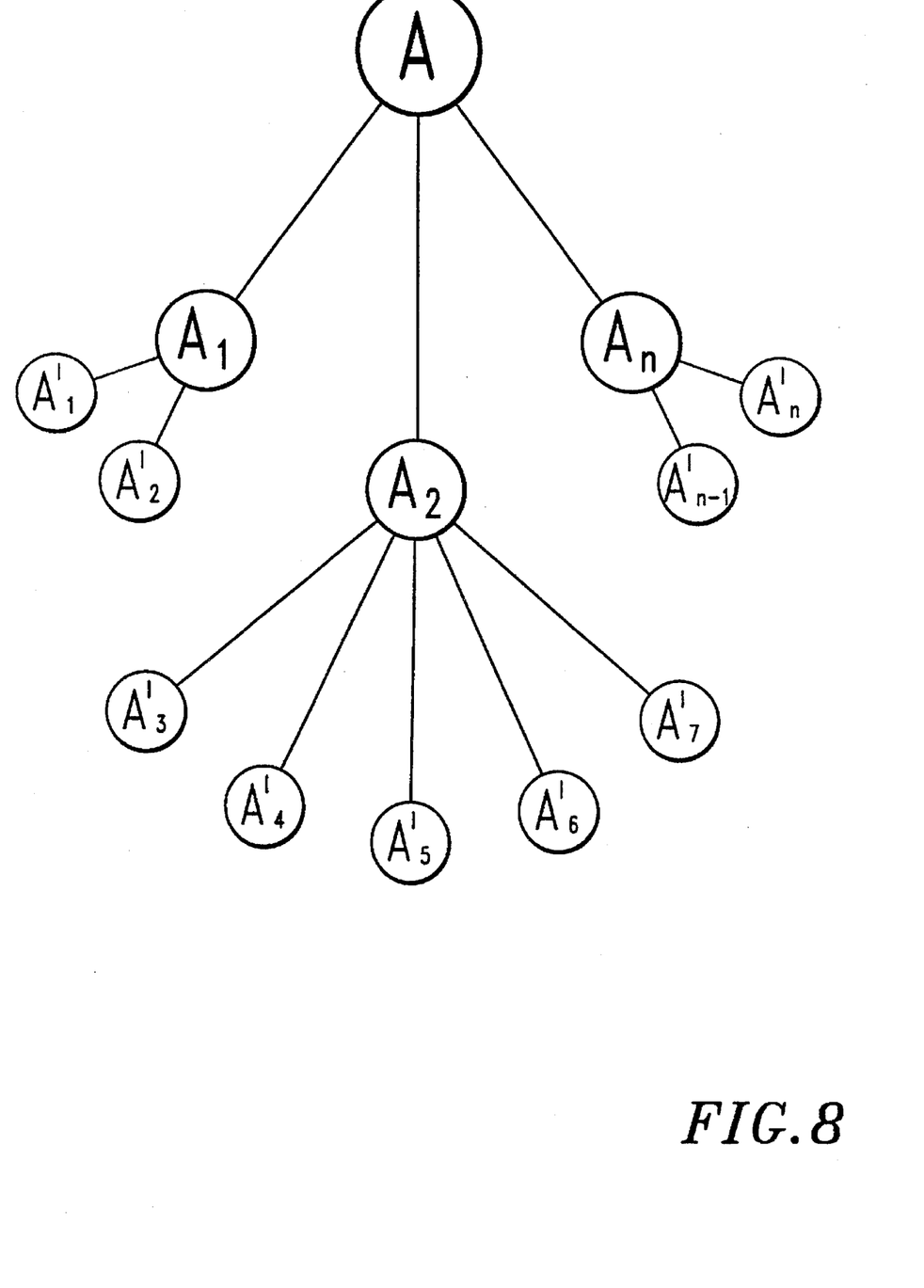
FIG. 8 is a topological diagram of the present invention.

The statistics will show that the watt-hour summary on intelligent power consumption meter A1' and A2' will not equal to intelligent power consumption meter A1. Furthermore, if a thief acts in front of the intelligent power consumption meter An, the watt-hours on meter A will not equal to the summary of A1, A2, . . . An. In this way, theft will be detected. Power leakage could also be detected by the same method. When a theft occurs, an alarm on the intelligent power consumption meter 5 will be triggered and sound for a minute, and if the action continues, the intelligent power consumption meter 5 will cut off the power supply to the user and will make a record of the incident. The power supply administration will be informed of the theft, and the user will receive his penalty. If the user continues to steal power from the power lines, he/she will be punished again because the central controller 1 is already aware of the occurrences. After the theft has been detected and the matter has been resolved, the power supply is resumed.

In short, after being initiated by the central controller 1, the intelligent power consumption meters are activated. Each intelligent power consumption meter 5 will alarm if the deposit is exceeded. Users can push the alarm reset button to stop the alarm from sounding, but the record of the theft is made of permanent record in the central controller 1 irregardless. In a second embodiment of the present invention, the structure and execution are the same as just described, but the communication medium selected are telephone lines or special data communication lines.

In a third embodiment of the present invention, the structure and execution are the same as in the first and second embodiment, except that the communication medium selected are radio channels.

We claim:

1. An intelligent power consumption monitoring and control system comprising a central controller, a power consumption data transfer mechanism and power consumption meters, wherein said central controller consists of a computer with management software, and a communication controller connected by cables to said computer;

said power consumption data transfer mechanism includes said communication controller and data transfer media;

each of said power consumption meters being connected to said data transfer media, each of said power consumption meters includes case, a data display, and a meter PCB board, wherein said meter PCB board includes a single chip microcomputer, program storage, data memory, a transmitter and receiver, an A/D and D/A module, a theft control and power line balance detection module having an oscillating circuit connecting to a power supply line, and a power supply module.

2. An intelligent power consumption monitoring and control system as claimed in claim 1, wherein said communication controller comprises a transmitter and receiver including modems and insulators.

* * * * *

UNITED STATES PATENT AND TRADEMARK OFFICE
CERTIFICATE OF CORRECTION

PATENT NO. : 5,664,202
DATED : September 2, 1997
INVENTOR(S) : Chen, et al

It is certified that error appears in the above-indentified patent and that said Letters Patent is hereby corrected as shown below:

On the title page: Item [73] Assignee: C & C Technology Enterprises (BVI) Limited, Tortola, Br. Virgin Islands--.

Signed and Sealed this

Ninth Day of November, 1999

Attest:

Q. TODD DICKINSON

Attesting Officer

Acting Commissioner of Patents and Trademarks